United States Patent Office 3,344,507
Patented Oct. 3, 1967

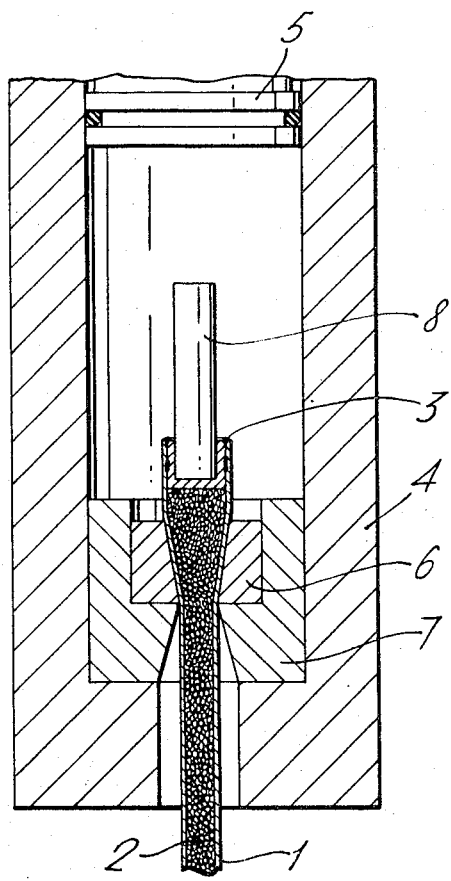

3,344,507
HYDROSTATIC EXTRUSION OF SHEATHED
CERAMIC NUCLEAR FUEL MATERIAL
Derek Green, Lytham St. Anne's, England, assignor to
United Kingdom Atomic Energy Authority, London,
England
Filed Dec. 12, 1963, Ser. No. 330,047
Claims priority, application Great Britain, Dec. 19, 1962,
48,048/62
15 Claims. (Cl. 29—420.5)

This invention relates to the production of articles by cold extrusion.

A problem exists in the production of articles by hydrostatic extrusion in that the pressurised fluid employed for driving the material to be extruded through the extrusion die can leak past the die, which is inconvenient. Furthermore, if leakage does occur, it does not necessarily do so in a predictable manner and thus may not serve to lubricate the whole of the operative surface area of the die. Still further, the fluid employed for the production of hydrostatic pressure may not possess lubricating properties, particularly when extrusion pressures and reduction ratios are high, sufficient to avoid damaging of the material being extruded as by surface galling and ringing. Ringing comprises annular ridges produced by a stop-start motion of the member through the die caused by fluid pressure build up and release.

It is an object of the present invention to provide an improved method of production of articles by hydrostatic extrusion in which the disadvantages of leakage past the die and damage to the articles are wholly or largely overcome.

According to the invention, a method of producing an article by hydrostatic extrusion which employs an extrusion die, a pressurised fluid, a container for said fluid and for a workpiece to be extruded to produce the article, said container communicating with said die, and means for pressurising said fluid to drive said workpiece through said die, includes the step of coating said workpiece, prior to extrusion, with a tenacious deformable coating, which coating prevents direct contact between the die and the surface of said workpiece and furthermore provides sealing means preventing escape of fluid past said die during extrusion, the coating being maintained in substantially unbreached form during extrusion.

British patent specification No. 933,500 discloses a method of preparing a nuclear reactor fuel element of the kind comprising fuel in particulate form enclosed in a protective sheath, the method envisaging the filling of the sheath with the particulate fissile material, and the extrusion of the filled sheath through a die to effect compacting of the fissile material and intimate contact between the sheath and the fissile material. In a conventional extrusion process the workpiece (which can be a metallic sheath containing fissile material) is contained in a cylindrical chamber and is driven through a die by means of a ram which bears on the end of the workpiece and physically ejects the workpiece through the die. When a sheathed member is extruded in this manner the extruding load produces an initial swelling of the sheath resulting in high frictional resistance to sliding between the wall of the containing chamber and the sheath and the wall thickness of the sheath must be adequate to prevent rupture under these conditions. In the interests of neutron economy it is preferable to limit the amount of non-fissile material to a minimum and therefore the sheath wall thickness should be the minimum compatible with operating requirements in a nuclear reactor core.

It is therefore another object of the present invention to provide an improved method of producing by extrusion, fuel elements of the aforementioned kind.

According to a further aspect of the invention, a method of producing a nuclear reactor fuel element includes the steps of: filling an elongate tubular metallic member with fissile material in particulate or friable form to a density of at least about 60% of the theoretical solid density, applying end closures to the member, coating the external surfaces of the member with a tenacious, deformable coating, and hydrostatically extruding the material-filled member through at least one die to reduce its lateral cross-section and thereby compact the material to a density in excess of 60%, said coating preventing direct contact between the die and the surface of said body and furthermore providing sealing means preventing escape of fluid past said die during extrusion, the coating being maintained in substantially unbreached form during extrusion.

By hydrostatically extruding the material-filled member through a die is meant driving the member through the die by fluid pressure means in which the fluid pressure is contained within a container which houses the member, pressure being exerted directly on external surfaces of the member. It is to be observed that the member is in physical contact only with the pressurised fluid and, through said coating, with the die.

For producing the tenacious, deformable coating, one example envisages latex solution (one suitable form being commercially known as "Evostik" impact adhesive, the word "Evostik" being a registered trademark) thinned for application to the member by petroleum ether or by methyl-ethyl-ketone. Other examples comprises, firstly, a suspension of finely powdered polytetrafluoroethylene in a fluorinated hydrocarbon aerosol (for example, the composition commercially known by the trademark "Flucalub" and which comprises a suspension of finely powdered Teflon in Freon, Teflon and Freon being trademarks also), and, secondly, a suspension of finely powdered polytetrafluoroethylene in chromic or phosphoric acid, a suitable mixture being sold commercially under the trademark Fluon. The latter example of coating is found to be particularly suitable for coatings for magnesium alloy tubular members prior to hydrostatic extrusion.

The use of hydrostatic extrusion substantially obviates the initial swelling of the member into contact with the containing chamber such as is caused by direct contact with the plunger used in conventional extruding techniques and thus enables use of a relatively thin walled member.

The use of a coating of tenacious, deformable material facilitates the extrusion of the filled member by substantially sealing the passage of the member through the die against fluid leakage and gives an extruded product substantially free from surface imperfections such as are caused by galling and ringing.

Preferably, extrusion of the member is performed by a plurality of steps through a series of dies each of progressively decreasing magnitude, the member being subjected to annealing heat treatment or treatments and recoating with the tenacious deformable material between steps.

The fissile material is preferably uranium dioxide and the member is stainless steel.

The fissile material may be a mixture of uranium dioxide and stainless steel and the member stainless steel.

Fuel element specimens may be prepared in the manner of the invention by, in a typical example illustrated by the accompanying drawing, filling cylindrical stainless steel tubes 1, one of which is shown in the drawing, with uranium dioxide powder 2 to a theoretical density of approximately 75% followed by extrusion. The tubes 1 are made from austenitic stainless steel (composition to specification EN58F.) 0.420 inch outside diameter and 6" in length. The wall thicknesses of different specimens of tube vary between 0.010 inch and 0.023 inch. Thimble shaped end caps 3 of stainless steel of similar composition are fitted to the tubes at each end and edge- and seam-welded in position to define a cylindrical recess at each end of the specimen. The extruding apparatus comprises a cylindrical fluid container 4 having a glanded plunger 5 at one end and a die 6 housed in a socket 7 located at the other end coaxial with the plunger. The plunger 5 is removed from the fluid container and a filled tube, after being externally coated with latex solution (known by the registered trademark "Evostik" as aforesaid) thinned by methyl-ethyl-ketone, is inserted via the plunger guide and centred over the die. The fluid container is filled with castor oil and the plunger re-inserted and forced into the container bore by a hydraulic press to pressurise the castor oil, which causes the filled tube to be extruded through the die, reducing its cross-sectional area thereby. To prevent damage to the rear end of the specimen as it emerges from the die (thought to be due to a pocket of high pressure fluid bursting open the end cap and tube as it emerges from the die at the moment when the rim of the end cap is still sealed in the die but with the main length of the cap unsupported) a soft metal rod 8, such as aluminium, is fitted in the recess of the rear end cap of the specimen. After each specimen has passed through the die, fluid pressure is reduced to atmospheric and the next, previously prepared, specimen for passing through the die is located by its front end cap on the soft metal rod 8 retained in the die and projecting into the container and fluid pressure is again increased to effect extrusion. In this manner sudden releases of energy as the specimens pass through the die are avoided.

For use with specimens of the aforesaid dimensions, the die was of 0.390 inch diameter and had a die angle of 15° giving an extrusion ratio of 1.16:1. The extrusion pressures varied between 2000 and 4000 p.s.i. depending on the wall thickness of the tubes. Second and third passes were made through dies of 0.360 inch diameter and 0.343 inch diameter respectively giving extrusion ratios of 1.17 and 1.09:1. Extrusion pressures were between 18,000 and 19,000 p.s.i. for the second pass and between 10,000 and 13,000 p.s.i. for the third pass. The final theoretical density of the powder of the described specimens was of the order 93% but greater densities may be achieved by further extrusion passes or by greater extrusion ratios.

The coatings were removed from the specimen by washing in methyl-ethyl-ketone and the specimens were annealed by heat treatment at 1100° C. for half an hour between passes to maintain the tube material in workable condition. After heat treatment between the passes the specimens were re-coated with latex solution prior to the next extrusion step and after the final extrusion step and before the subsequent heat treatment the specimen was cleaned with methyl-ethyl-ketone. In a similar manner specimens comprising stainless steel sheaths containing uranium dioxide and initially of .450 inch diameter by 21" long were extruded to .35 inch diameter and length of the order 35".

Annular fuel element specimens have been produced by an extrusion process in accordance with the invention. In the preparation of each specimen two stainless steel tubes of approximate wall thickness 0.015 inch and respective inside diameters of 0.40 inch and 0.20 inch were supported coaxially at one end by a machined annular plug. The annular space was filled with crushed sintered $UO_2$ and vibro-compacted to a density of approximately 70% of the theoretical solid density.

The centre tube was filled and the open end of the annulus was sealed with a low melting point metal or alloy, for example that commercially known by the trademark Cerrobend, the function of the low melting point metal in the centre tube being to support it during extrusion. The specimen was externally coated with latex solution (known by the trademark "Evostik" as aforesaid) thinned by methyl-ethyl-ketone and then sprayed with a suspension of finely powdered polytetrafluoroethylene in a fluorinated hydrocarbon aerosol (known by the registered trademarks Teflon and Freon respectively). The specimen was extruded through a ratio 1.54:1 in three passes to achieve a uranium dioxide density of 85% theoretical solid density. The low melting point metal was then removed, the end of the annulus sealed by an annular plug secured by welding, and the specimen annealed at 1200° C. for ½ an hour.

In the production of another specimen, a 70:30 volume ration cement composition of stainless steel and uranium powder was compacted into pellets. The pellets were sintered at 1200° C. and loaded into a stainless steel sheath of 0.015 inch wall thickness and 0.400 inch diameter. The specimen was externally coated with latex solution and methyl-ethyl-ketone and then extruded through a ratio of 1.54:1 in two passes. The specimen was then cleaned with methyl-ethyl-ketone and heat treated at 1250° C. for 15 minutes. Subsequent examination showed that good steel matrix density had been achieved and the can was bonded to the pellets.

Numerous other advantages accrue from the use of hydrostatic extrusion for the production of fuel elements, namely:

(1) Fuel elements of very slender proportions and of long lengths can be produced (which would be impossible if a ram were to be employed for driving the fuel element through the die),
(2) The extrusion ratios may be changed by extruding fuel element workpieces of varying diameter in the same container and die assembly, and
(3) The entire fuel element workpiece can be extruded.

The described method applicable to the production of fuel elements also has advantage in that highly compacted fuel elements of cross-section other than circular, for example square or hexagonal, can be prepared.

Hydrostatic extrusion in the manner of the invention is also applicable to the production of other articles, for example, stainless steel sheathed mineral insulated electricity conducting cables commonly termed pyrotechnic cable, for example, that are used for conducting signals from the hot junction of a temperature sensing thermocouple installation.

After completing the extrusion steps of nuclear reactor fuel element specimens or other articles such as pyrotechnic cable, it is preferable to remove the coatings of tenacious, deformable material from the exterior surfaces. The coating including latex solution is removed by dissolving in methyl-ethyl-ketone as hereinbefore described and in the case of the coating material being a suspension of polytetrafluoroethylene in a carrier fluid, removal is achieved by machining.

In the extrusion of stainless steel members it has been found that a coating of latex solution remains unbreached with a reduction ratio of up to 2:1 when using a die having an included angle of 15° and in the case of an aluminum member remains unbreached with a reduction ratio of up to 30:1 also when using a die of 15°.

I claim:
1. In a method of producing an article by hydrostatic extrusion which employs an extrusion die, a pressurised fluid, a container for said fluid and for a workpiece to be extruded to produce the article said fluid being interposed between said workpiece and said container, said container communicating with said die, and means for pressurising said fluid to drive said workpiece through said die, said method including the step of coating said workpiece, prior to extrusion, with a solid tenacious, deformable coating, which coating prevents direct contact between the die and the surface of said workpiece and provides sealing means preventing escape of pressurised fluid past said die during extrusion, the coating being maintained in substantially unbreached form during extrusion.

2. A method of producing a nuclear reactor fuel element including the steps of: filling an elongate tubular metallic member with fissile material in particulate or friable form to a density of at least about 60% of the theoretical solid density, applying end closures to the member, coating the external surfaces of the member with a solid tenacious, deformable coating, and hydrostatically extruding the material-filled member through at least one die to reduce its lateral cross-section and thereby compact the material to a density in excess of 60%, said coating preventing direct contact between the die and the surface of said member and providing sealing means preventing escape of pressurised fluid past said die during extrusion, the coating being maintained in substantially unbreached form during extrusion.

3. A method according to claim 2, wherein the step of hydrostatic extrusion of the material-filled member is repeated through a series of dies of progressively decreasing magnitude to attain the desired configuration.

4. A method according to claim 3, wherein the member is subject to annealing heat treatment and is re-coated with the tenacious, deformable material between each hydrostatic extrusion step.

5. A method according to claim 2, wherein the member comprises two coaxial tubes and the fissile material is contained in the void bounded by the tubes.

6. A method according to claim 2, wherein the fissile material is uranium dioxide and the member is of stainless steel.

7. A method according to claim 2, wherein the fissile material comprises a mixture of uranium dioxide and stainless steel and the member is of stainless steel.

8. A method according to claim 1, wherein the tenacious, deformable material includes a latex solution in petroleum ether or methyl-ethyl-ketone.

9. A method according to claim 2, wherein the tenacious, deformable material includes a latex solution in petroleum ether or methyl-ethyl-ketone.

10. A method according to claim 1, wherein the tenacious, deformable material includes a suspension of powdered polytetrafluoroethylene in a fluorinated hydrocarbon.

11. A method according to claim 2, wherein the tenacious, deformable material includes a suspension of powdered polytetrafluoroethylene in a fluorinated hydrocarbon.

12. A method according to claim 1, wherein the tenacious, deformable material includes a suspension of powdered polytetrafluoroethylene in chromic or phosphoric acid.

13. A method according to claim 2, wherein the tenacious, deformable material includes a suspension of powdered polytetrafluoroethylene in chromic or phosphoric acid.

14. A method according to claim 2, wherein the trailing end of the member in passage through the die is provided with a demountable tail piece whereby the member can be fully extruded through the die without substantial fluid pressure release.

15. A method of producing nuclear reactor fuel elements according to claim 14, wherein a material-filled and closed tubular member is, prior to extrusion, mounted by an end closure onto a tail piece in passage through the die.

References Cited

UNITED STATES PATENTS

| | | | |
|---|---|---|---|
| 2,558,035 | 6/1951 | Bridgman | 72—60 |
| 3,126,096 | 3/1964 | Gerard et al. | 72—54 |
| 3,181,328 | 5/1965 | Zeitlin | 72—271 |

JOHN F. CAMPBELL, *Primary Examiner.*

P. M. COHEN, *Assistant Examiner.*